United States Patent
Achilles et al.

(10) Patent No.: US 11,552,476 B1
(45) Date of Patent: Jan. 10, 2023

(54) SYSTEM AND METHOD FOR CONVERTER CONTROL OF AN INVERTER-BASED RESOURCE

(71) Applicant: General Electric Company, Schenectady, NY (US)

(72) Inventors: Alfredo Sebastian Achilles, Niskayuna, NY (US); Dustin Howard, Brookhaven, GA (US); Ling Xu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/477,781

(22) Filed: Sep. 17, 2021

(51) Int. Cl.
- *H02J 3/38* (2006.01)
- *H02J 13/00* (2006.01)
- *H02P 9/02* (2006.01)

(52) U.S. Cl.
CPC ........ *H02J 3/381* (2013.01); *H02J 13/00002* (2020.01); *H02P 9/02* (2013.01); *H02J 2300/28* (2020.01)

(58) Field of Classification Search
CPC .......... H02J 3/38; H02J 3/381; H02J 2300/28; H02J 13/00002; H02J 13/00; H02P 9/02
See application file for complete search history.

(56) References Cited

U.S. PATENT DOCUMENTS 7,119,452 B2   10/2006   Larsen

*Primary Examiner* — Robert L Deberadinis
(74) *Attorney, Agent, or Firm* — Dority & Manning, P.A.

(57) ABSTRACT

A method for controlling an inverter-based resource (IBR) connected to an electrical grid includes receiving grid parameter(s) and applying a droop function to the grid parameter(s) to determine a power droop signal. Further, the method includes receiving a power reference signal. Moreover, the method includes determining a power command signal as a function of the power droop signal and the power reference signal to allow for a fast response in a power output of the IBR to the grid parameter(s). The method also includes applying power constraint(s) to the power command signal to limit how much the power output of the IBR can be changed due to the grid parameter(s). Further, the method includes determining one or more control commands for the IBR based, at least in part, on the power command signal. Thus, the method includes controlling the IBR based, at least in part, on the power command signal.

20 Claims, 11 Drawing Sheets

SYSTEM AND METHOD FOR CONVERTER CONTROL OF AN INVERTER-BASED RESOURCE

FIELD

The present disclosure relates generally to inverter-based resources, such as wind turbine power systems and more particularly, to a converter control method and system for inverter-based resources that provide fast power response to grid frequency changes together with fast terminal voltage regulation as a means to stabilize the converter controls in grids with low penetrations of synchronous generators.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to an electrical grid. In other words, variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency.

Moreover, power generation projects utilizing inverter-based resources are increasingly being connected to weak AC transmission networks. One of the reasons causing weaker grid connections is the displacement of conventional synchronous generation by inverter-based resources, which make the grid collectively weaker due to the loss of voltage-source characteristics of synchronous generation. Additionally, the loss of inertia contributed by the synchronous machines leads to more rapid frequency changes in the grid, which may have a destabilizing effect on the inverter-based resource(s).

Historically, power grids generally operate with enough synchronous generation connected at any given time to give stable voltage and frequency throughout the power grid. Since conventional inverter-based resources rely on a relatively stable grid voltage and frequency to operate stably, the synchronous generation connected to the grid are key enablers for conventional inverter-based resources. However, power grids are increasingly seeing portions of time in which penetration levels of inverter-based resources are becoming very large, e.g., >60%. Conventional inverter-based resources may be approaching its limitation of stability as penetration of synchronous generation approaches 0%.

Accordingly, the present disclosure is directed to a system and method of power control to improve stability in inverter-based resource converter controls for systems with low-penetration levels of synchronous generation, thereby allowing higher penetration of inverter-based resources in power grids.

BRIEF DESCRIPTION

Aspects and advantages of the invention will be set forth in part in the following description, or may be obvious from the description, or may be learned through practice of the invention.

In one aspect, the present disclosure is directed to a method for controlling an inverter-based resource connected to an electrical grid. The method includes receiving, via a controller, one or more grid parameters of the electrical grid. The method also includes applying, via the controller, a droop function to the one or more grid parameters of the electrical grid to determine a power droop signal. Further, the method includes receiving, via the controller, a power reference signal from an external controller. Moreover, the method includes determining, via the controller, a power command signal as a function of the power droop signal and the power reference signal to allow for a fast response in a power output of the inverter-based resource to the one or more grid parameters of the electrical grid. In addition, the method includes applying, via the controller, one or more power constraints to the power command signal to limit how much the power output of the inverter-based resource can be changed due to the one or more grid parameters of the electrical grid. Further, the method includes determining, via the controller, one or more control commands for the inverter-based resource based, at least in part, on the power command signal. Thus, the method includes controlling, via the controller, the inverter-based resource based, at least in part, on the power command signal.

In an embodiment, the one or more grid parameters may include, for example, a grid frequency signal and a grid frequency reference signal of the electrical grid.

In another embodiment, the droop function may be a fast-frequency droop function. In such embodiments, the method may include tuning the fast-frequency droop function with a response time ranging from about 10 milliseconds (ms) to about 100 ms. Further, in an embodiment, the fast-frequency droop function may be one of a proportional droop function, a quadratic droop function, or a combination thereof.

In further embodiments, the method may include applying a rate limit to the power droop signal to limit the how fast grid frequency changes can cause changes in a power output of the inverter-based resource so as to limit adverse equipment impacts thereof.

In additional embodiments, the one or more power constraints may include an upper power constraint and a lower power constraint. Thus, in certain embodiments, the method may include applying upper and lower power equipment limits to the upper and lower power constraints.

In several embodiments, the method may include determining the upper power constraint as a function of a combination of two or more of the following: the power reference signal, an upper power headroom available to change the power output of the inverter-based resource based on one or more needs of the electrical grid, and a power available within the inverter-based resource for injection from the electrical grid.

In another embodiment, the method may include determining the lower power constraint as a function of a combination of two or more of the following: the power reference signal, a lower power headroom available to change the power output of the inverter-based resource based on one or more needs of the electrical grid, and a power available within the inverter-based resource for absorption from the electrical grid.

In still further embodiments, the inverter-based resource may be part of a wind turbine power system having at least one generator. Thus, in particular embodiments, the power available within the inverter-based resource for injection from the electrical grid may include, for example, energy stored within a battery or a rotor of the wind turbine power system.

In additional embodiments, the controller may be a turbine controller or a converter controller of the wind turbine power system.

In another embodiment, the method may include determining the power command signal as a function of the power droop signal and the power reference signal to allow for the fast response in the power output of the inverter-based resource to the one or more grid parameters of the electrical grid while also implementing fast closed-loop voltage control in the inverter-based resource.

In another aspect, the present disclosure is directed to a system for controlling an inverter-based resource connected to an electrical grid. The system includes a controller comprising at least one processor. The processor(s) is configured to perform a plurality of operations, including but not limited to applying a fast-frequency droop function to one or more grid frequency parameters of the electrical grid to generate a power droop signal that provides a fast response of a power output of the inverter-based resource to variations in the grid frequency while simultaneously implementing fast closed-loop voltage control in the inverter-based resource and applying one or more power constraints to a power command signal of the inverter-based resource to limit how much the power output of the inverter-based resource can be changed due to the one or more grid frequency parameters of the electrical grid. It should be understood that the system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
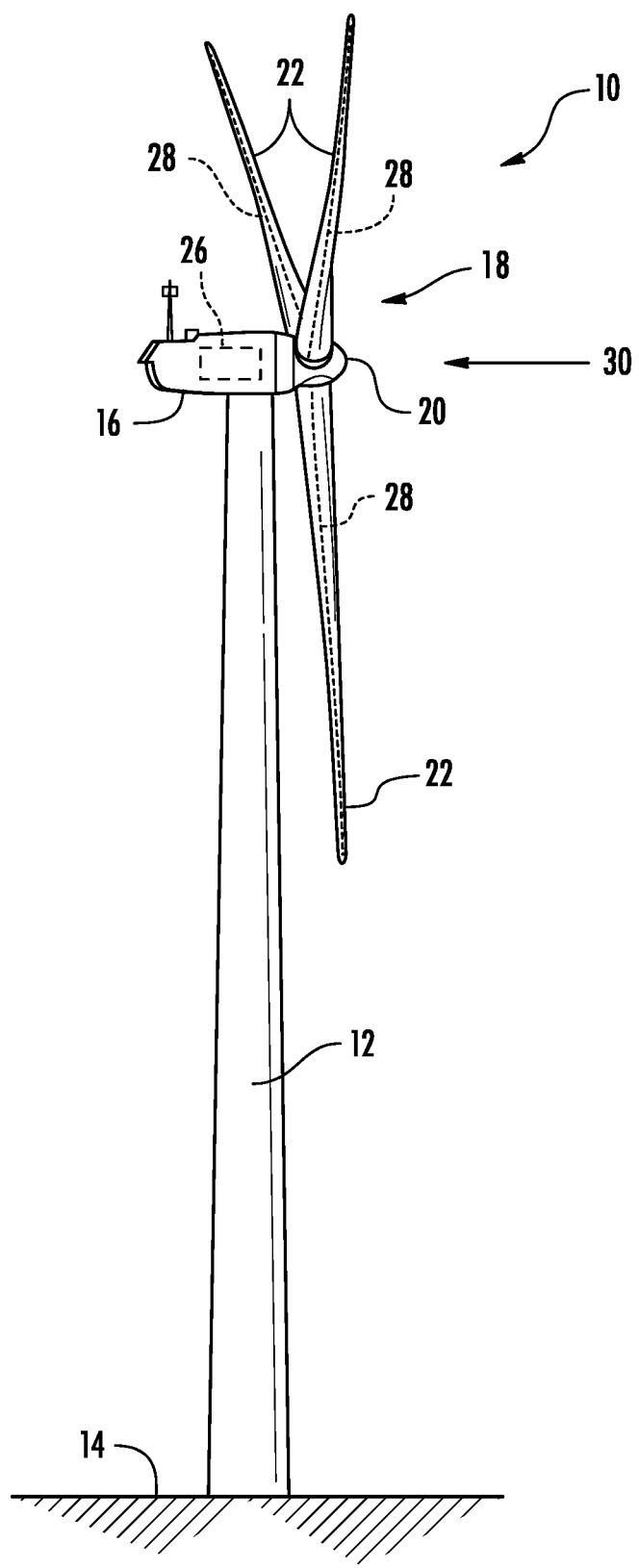
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a converter control method for inverter-based resources (IBR) that provides fast power response to grid frequency changes together with fast terminal voltage regulation as a means to stabilize the converter controls in grids with low penetrations of synchronous generators. As used herein, inverter-based resources generally refer to electrical devices that can generate or absorb electric power through switching of power-electronic devices. Accordingly, inverter-based resource may include wind turbine power systems, solar inverters, energy-storage systems, STATCOMs, or hydro-power systems. For example, in one embodiment, the inverter-based resource may be a wind turbine power system having a rotor-side converter, a line-side converter, and a doubly-fed induction generator (DFIG) connected to the electrical grid.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 1) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
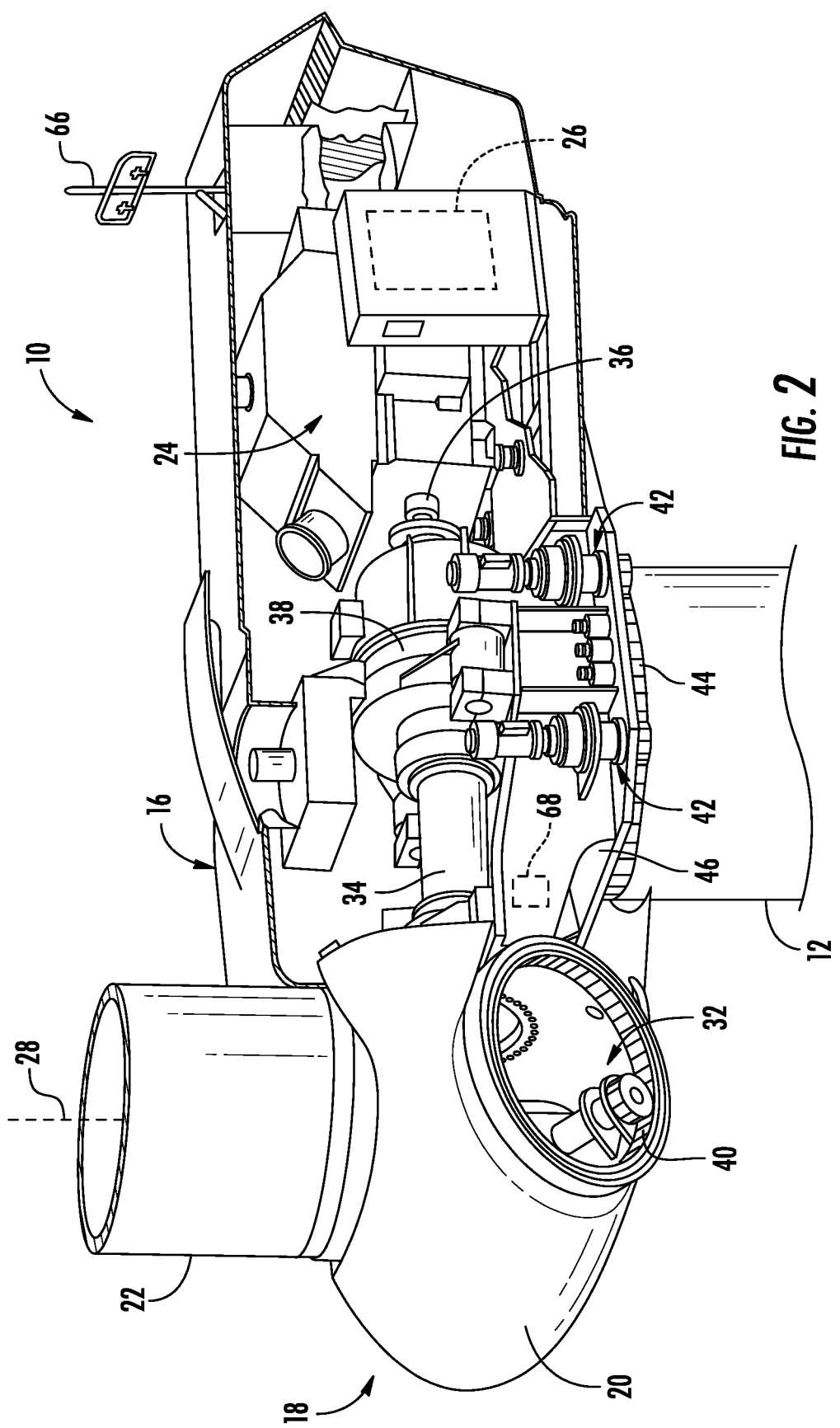
FIG. 2 illustrates a simplified, internal view of one embodiment of a nacelle according to the present disclosure.
Figure 4:
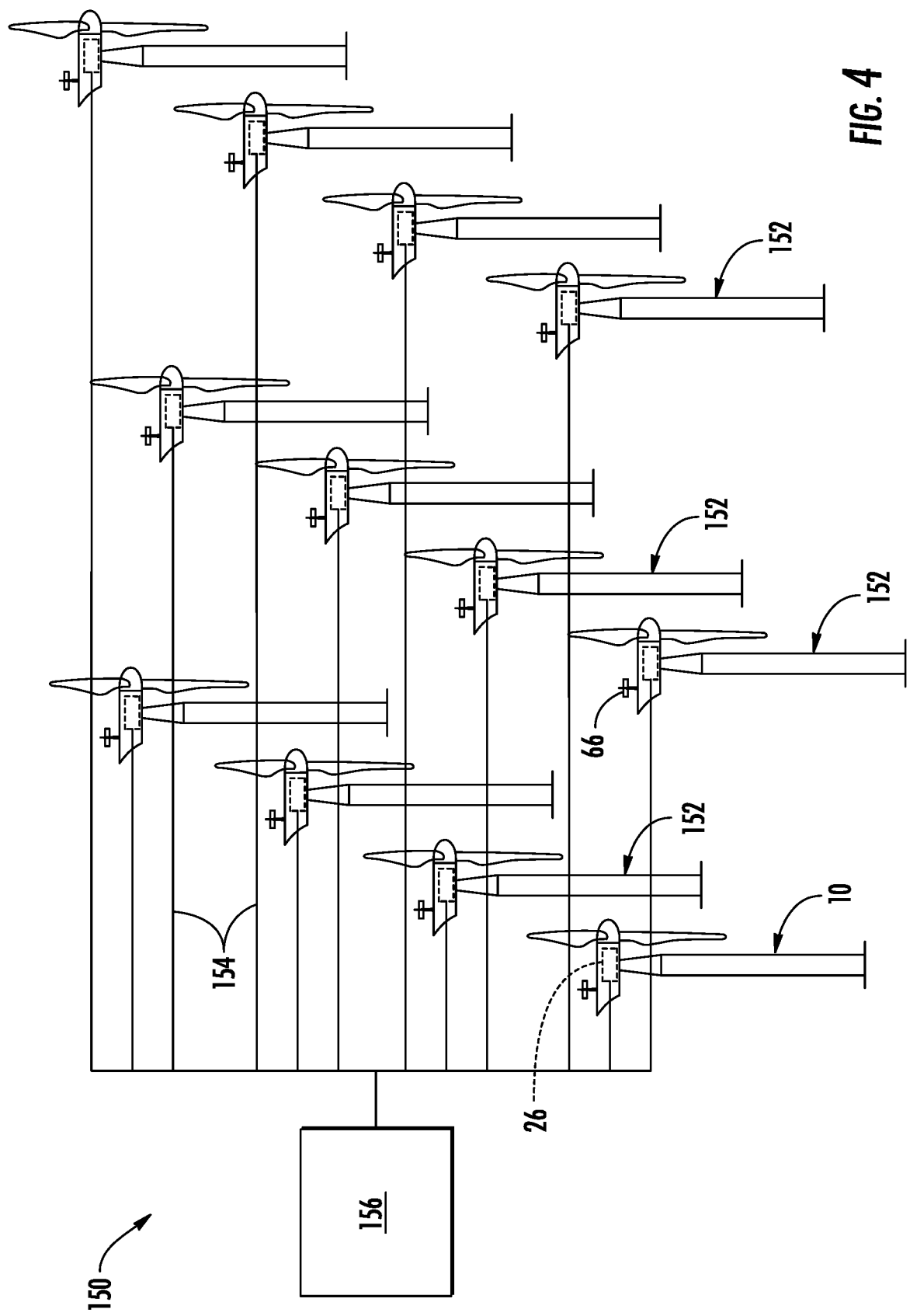
FIG. 4 illustrates a schematic view of one embodiment of a wind farm having a plurality of wind turbines according to the present disclosure.

Referring now to FIG. 2, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
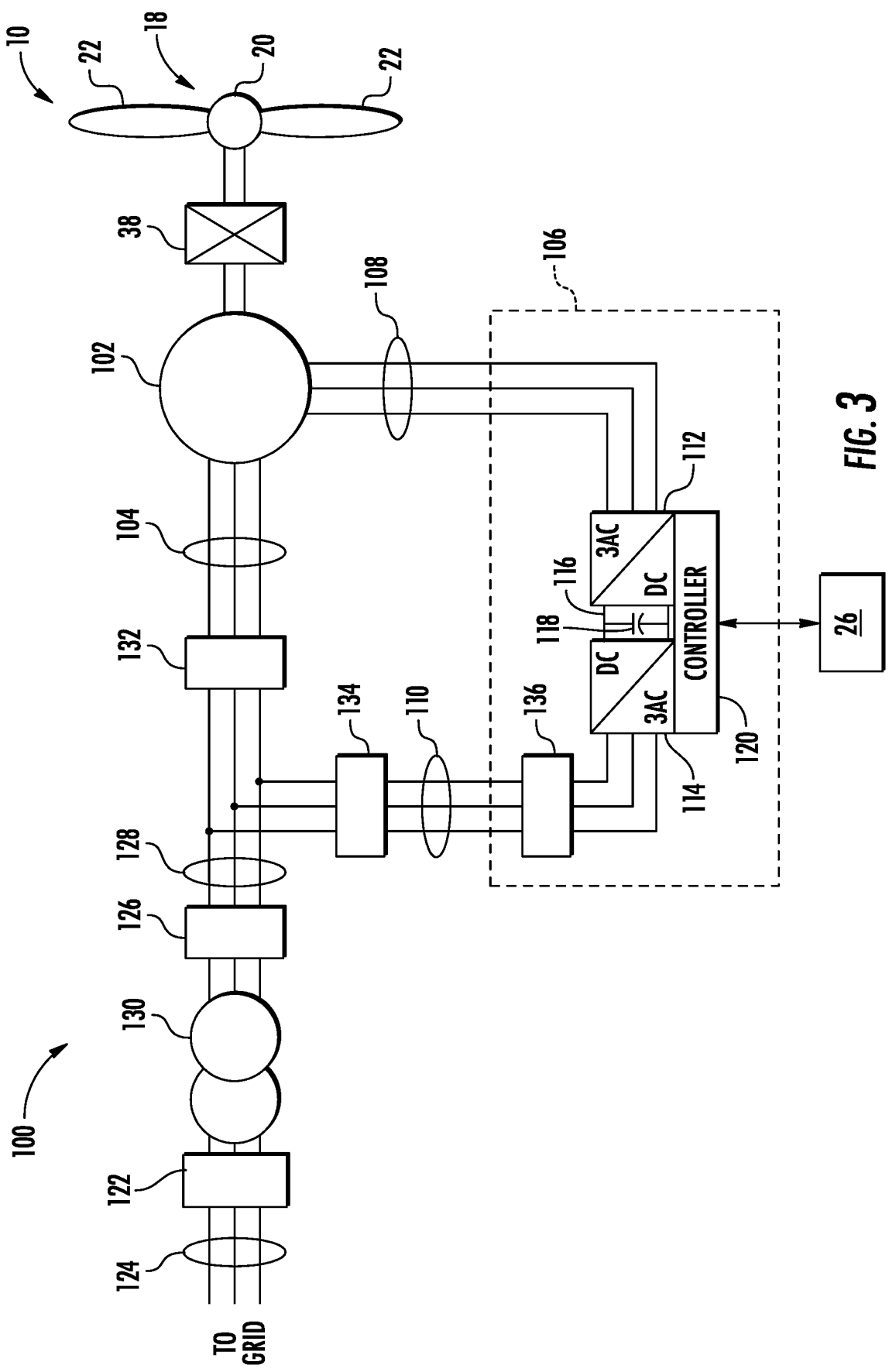
FIG. 3 illustrates a schematic view of one embodiment of a wind turbine electrical power system suitable for use with the wind turbine shown in FIG. 1.

Referring now to FIG. 3, a schematic diagram of one embodiment of a wind turbine power system 100 is illustrated in accordance with aspects of the present disclosure. Although the present disclosure will generally be described herein with reference to the wind turbine 10 shown in FIG. 1, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 3 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor-side converter (RSC) 112 and a line-side converter (LSC) 114. The DFIG 102 is coupled via the rotor bus 108 to the rotor-side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor-side converter 112 and/or the line-side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus 108, sinusoidal multi-phase (e.g., three-phase) alternating current (AC) power is provided to the power converter 106. The rotor-side converter 112 converts the AC power provided from the rotor bus 108 into direct current (DC) power and provides the DC power to the DC link 116. As is generally understood, switching elements (e.g., IGBTs) used in the bridge circuits of the rotor-side converter 112 may be modulated to convert the AC power provided from the rotor bus 108 into DC power suitable for the DC link 116.

In addition, the line-side converter 114 converts the DC power on the DC link 116 into AC output power suitable for the electrical grid 124. In particular, switching elements (e.g., IGBTs) used in bridge circuits of the line-side converter 114 can be modulated to convert the DC power on the DC link 116 into AC power on the line side bus 110. The AC power from the power converter 106 can be constrained with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 4, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g., through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Figure 5:
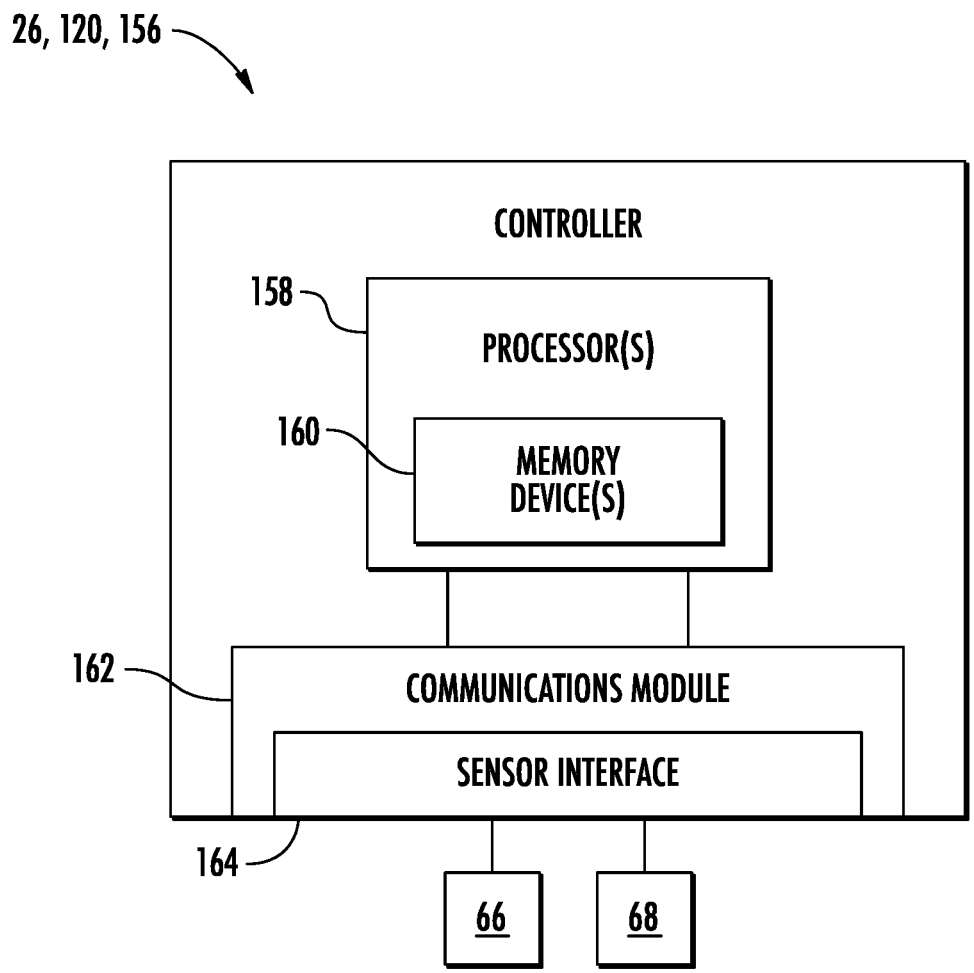
FIG. 5 illustrates a block diagram of one embodiment of a controller according to the present disclosure.

Referring now to FIG. 5, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 6A:
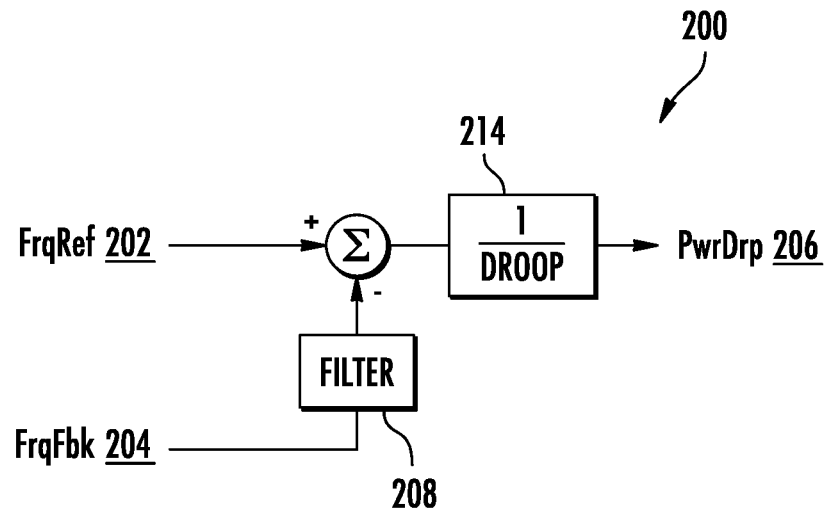
FIG. 6A illustrates a schematic diagram of one embodiment of a proportional frequency droop function without frequency deadband according to conventional construction.
Figure 6B:
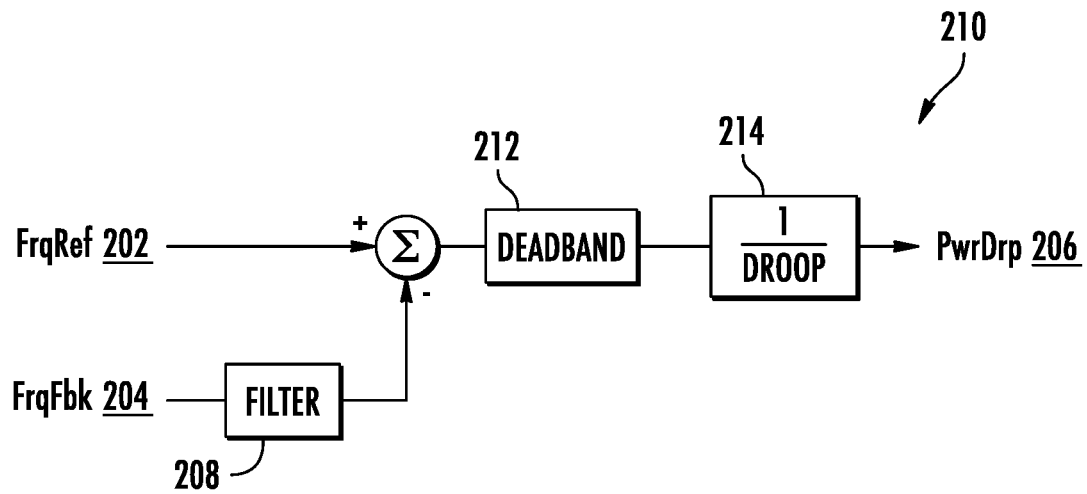
FIG. 6B illustrates a schematic diagram of one embodiment of a proportional frequency droop function with frequency deadband according to conventional construction.

As is generally understood by those having ordinary skill in the art, frequency droop control is a commonly used control method to accommodate active power sharing between power plants, such as the wind farm 150). Thus, as shown in FIGS. 6A-6B, frequency droop structures are shown according to conventional construction. In particular, as shown in FIG. 6A, a proportional frequency droop function 200 having a droop function 214 without a frequency deadband is illustrated, whereas FIG. 6B illustrates a proportional frequency droop 210 having a droop function 214 with a frequency deadband 212. Thus, as shown, frequency droop control involves taking the difference between a frequency reference (e.g., FrqRef 202) and actual frequency feedback (e.g., FrqFbk 204) and changing the power reference to the generator based in proportion to this difference in a direction that supports the grid frequency (e.g., increase the power reference for grid frequency below the frequency reference using a power droop signal (e.g., PwrDrp 206)). Moreover, as shown, the frequency droop structures may include a filter 208 for the frequency feedback.

In grids with high penetration of synchronous generators, the collective inertias of the generators prevent grid frequency from changing very quickly. Therefore, in conventional synchronous generation, frequency droop can be designed with a relatively slow response time (e.g., such as about 1 second to about 10 seconds). In existing inverter-based resource (IBR) installations, frequency droop functions are usually subject to a frequency dead band, relatively slow response times (from about 1 to about 10 seconds), and implemented in the plant-level controls.

Figure 7:
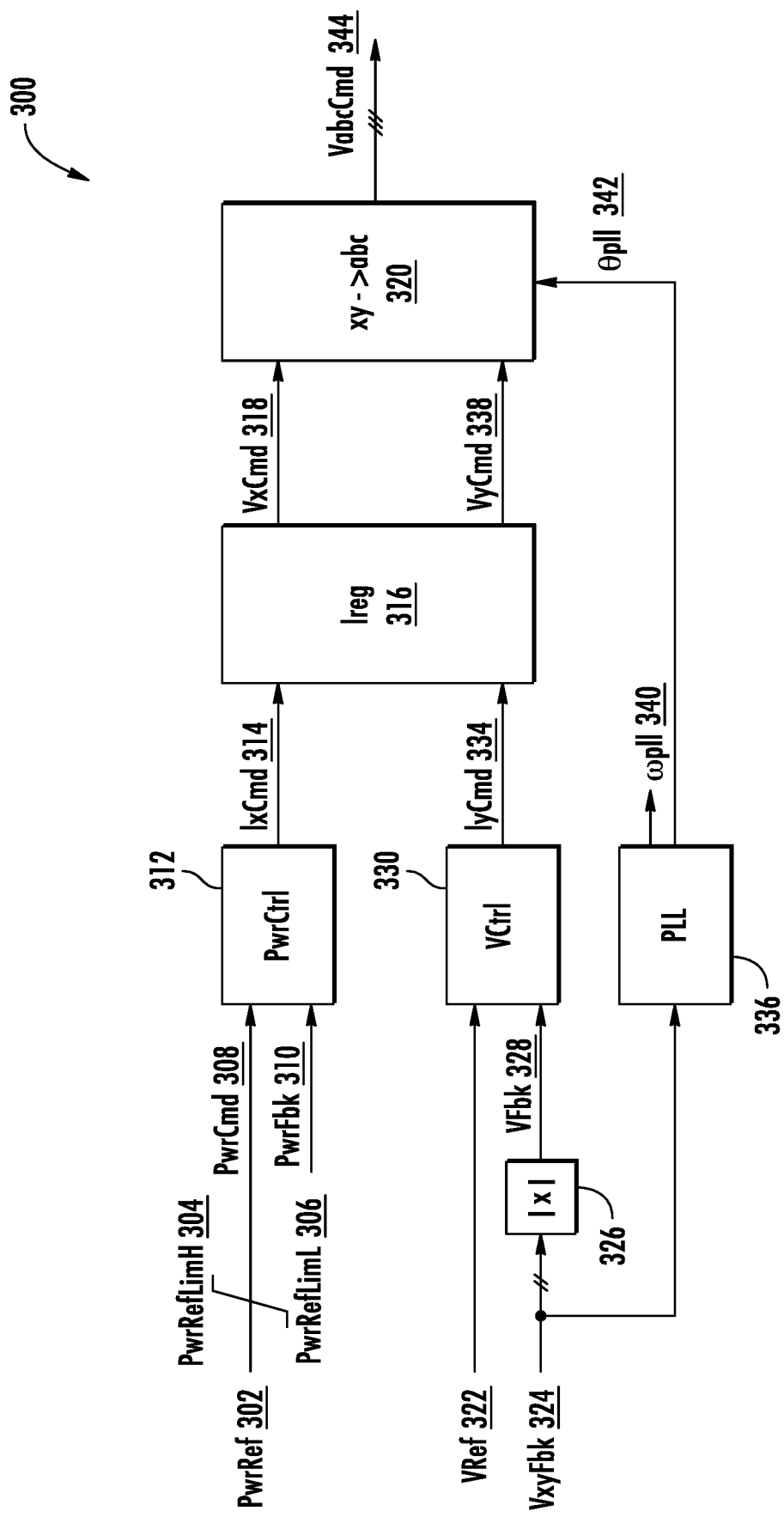
FIG. 7 illustrates a schematic diagram of one embodiment of an inverter-based resource control structure according to conventional construction.

Referring now to FIG. 7, an IBR converter control structure 300 that can be used to control, e.g., the power converter 160, with fast closed-loop voltage control according to conventional construction is illustrated. In conventional IBR converter control, power is injected to the grid independent of grid frequency. The power reference is usually determined by a maximum power point tracking algorithm to maximize the power generated by the IBR based on locally available power. In particular, as shown, this power reference (e.g., PwrRef 302) is constrained by equipment limitations (e.g., PwrRefLimH 304 and PwrRefLimL 306) to determine a power command (e.g., PwrCmd 308). Thus, as shown, a power controller 312 receives the power command 308 and a power feedback signal and generates a current command (e.g., IxCmd 314). In addition, as shown, a voltage controller 330 receives a voltage reference (e.g., VRef 322) that may come from slower VAR regulation functions or plant-level volt/VAR regulators, as well as one or more voltage feedback signals (e.g., VxyFbk 324). As shown at 326, the voltage feedback signals may be first processed to generate a single voltage feedback signal (e.g., VFbk 328) that is received by the voltage controller 330. The voltage controller 330 can then also generate a current command (e.g., IyCmd 334). The current commands 314, 334 can then be used by a current regulator 316 to generate respective voltage commands 318, 338. Thus, in an embodiment, the voltage control can be tuned for a fast response, with typical closed-loop time constant between 20 milliseconds and 200 milliseconds.

Still referring to FIG. 7, the IBR converter control structure 300 may also include a phase-locked loop 336 that uses the voltage feedback signal(s) (e.g., VxyFbk 324) to generate a phase-locked loop angle (e.g., θpll 342) and a phase-locked loop angular frequency (e.g., ωpll 340). Thus, as shown, the phase-locked loop angle can be used, as shown at 320, to rotate the voltage commands 318, 338 to abc coordinates so as to generate three-phase voltage commands (e.g., VabcCmd 344). The voltage command can be sent to the converter controller 120 to provide suitable voltage control of the power converter 106.

Figure 8:
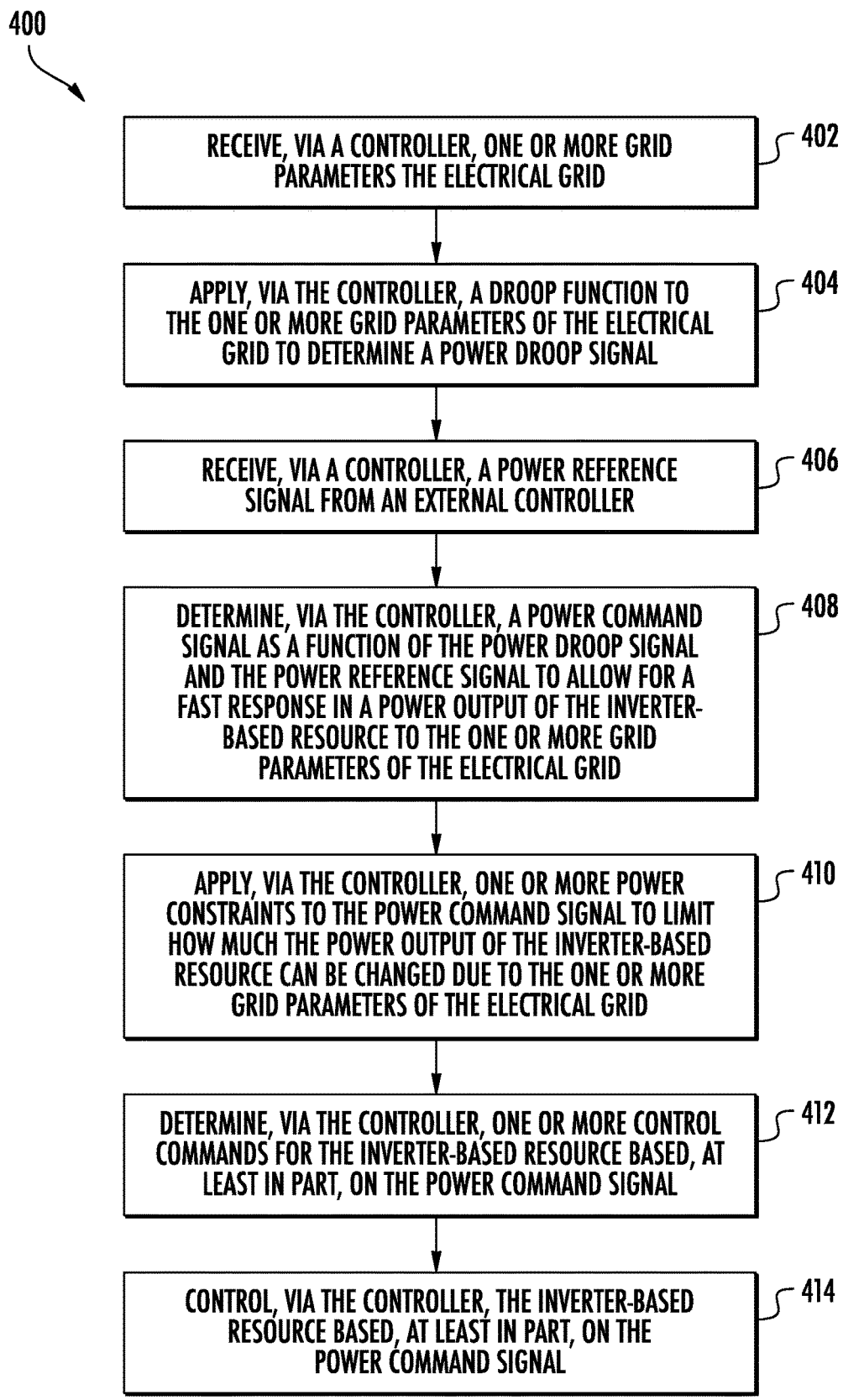
FIG. 8 illustrates a flow diagram of one embodiment of method for controlling an inverter-based resource connected to an electrical grid according to the present disclosure.

Referring now to FIG. 8, a flow diagram of one embodiment of a method 400 for controlling an inverter-based resource having a power converter connected to an electrical grid according to the present disclosure is provided. For example, the inverter-based resource may be a wind turbine power system having at least one power converter coupled to a generator. In general, the method 400 is described herein with reference to the wind turbine power system 100 of FIGS. 1-5. However, it should be appreciated that the disclosed method 400 may be implemented with any other suitable power generation systems having any other suitable configurations. Further, the method 400 may be implemented using the turbine controller 26, the converter controller 120, or any other suitable control device or combinations thereof. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, constrained, and/or adapted in various ways without deviating from the scope of the present disclosure.

As shown at (402), the method 400 includes receiving, via a controller, one or more grid parameters of the electrical grid. For example, in an embodiment, the grid parameters may include, for example, a grid frequency signal and a grid frequency reference signal of the electrical grid.

As shown at (404), the method 400 includes applying, via the controller, a droop function to the grid parameter(s) of the electrical grid to determine a power droop signal. For example, in an embodiment, the droop function may be a fast-frequency droop function. In such embodiments, the method 400 may also include tuning the fast-frequency droop function with a response time ranging from about 10 milliseconds (ms) to about 100 ms, which is similar to the PLL 336, to allow for fast response in the IBR power output to grid frequency variations. Further, in an embodiment, the fast-frequency droop function may be one of a proportional droop function, a quadratic droop function, or a combination thereof. In further embodiments, the method 400 may include applying a rate limit to the power droop signal to limit the how fast grid frequency changes can cause changes in a power output of the inverter-based resource so as to limit adverse equipment impacts thereof.

Still referring to FIG. 8, as shown at (406), the method 400 includes receiving, via the controller, a power reference signal from an external controller. As shown at (408), the method 400 includes determining, via the controller, a power command signal as a function of the power droop signal and the power reference signal to allow for a fast response in the power output of the inverter-based resource to the one or more grid parameters of the electrical grid.

As shown at (410), the method 400 includes applying, via the controller, one or more power constraints to the power command signal to limit how much the power output of the inverter-based resource can be changed due to the one or more grid parameters of the electrical grid. For example, in particular embodiments, the power constraint(s) may include an upper power constraint and a lower power constraint. Thus, in certain embodiments, the method 400 may include applying upper and lower power equipment limits to the upper and lower power constraints.

In several embodiments, the method 400 may include determining the upper power constraint as a function of a combination of two or more of the following: the power reference signal, an upper power headroom available to change the power output of the inverter-based resource based on one or more needs of the electrical grid, and a power available within the inverter-based resource for injection from the electrical grid. For example, in an embodiment, the power available within the inverter-based resource for injection from the electrical grid may include, for example, energy stored within a battery or a rotor of the wind turbine power system. Moreover, in an embodiment, the upper power headroom may be available from curtailment of the resource below the power available locally to the resource. In another embodiment, the method 400 may include determining the lower power constraint as a function of a combination of two or more of the following: the power reference signal, a lower power headroom available to change the power output of the inverter-based resource based on one or more needs of the electrical grid, and a power available within the inverter-based resource for absorption from the electrical grid.

Still referring to FIG. 8, as shown at (412), the method 400 includes determining, via the controller, one or more control commands for the inverter-based resource based, at least in part, on the power command signal. As shown at (414), the method 400 includes controlling, via the controller, the inverter-based resource based, at least in part, on the power command signal.

Figure 9:
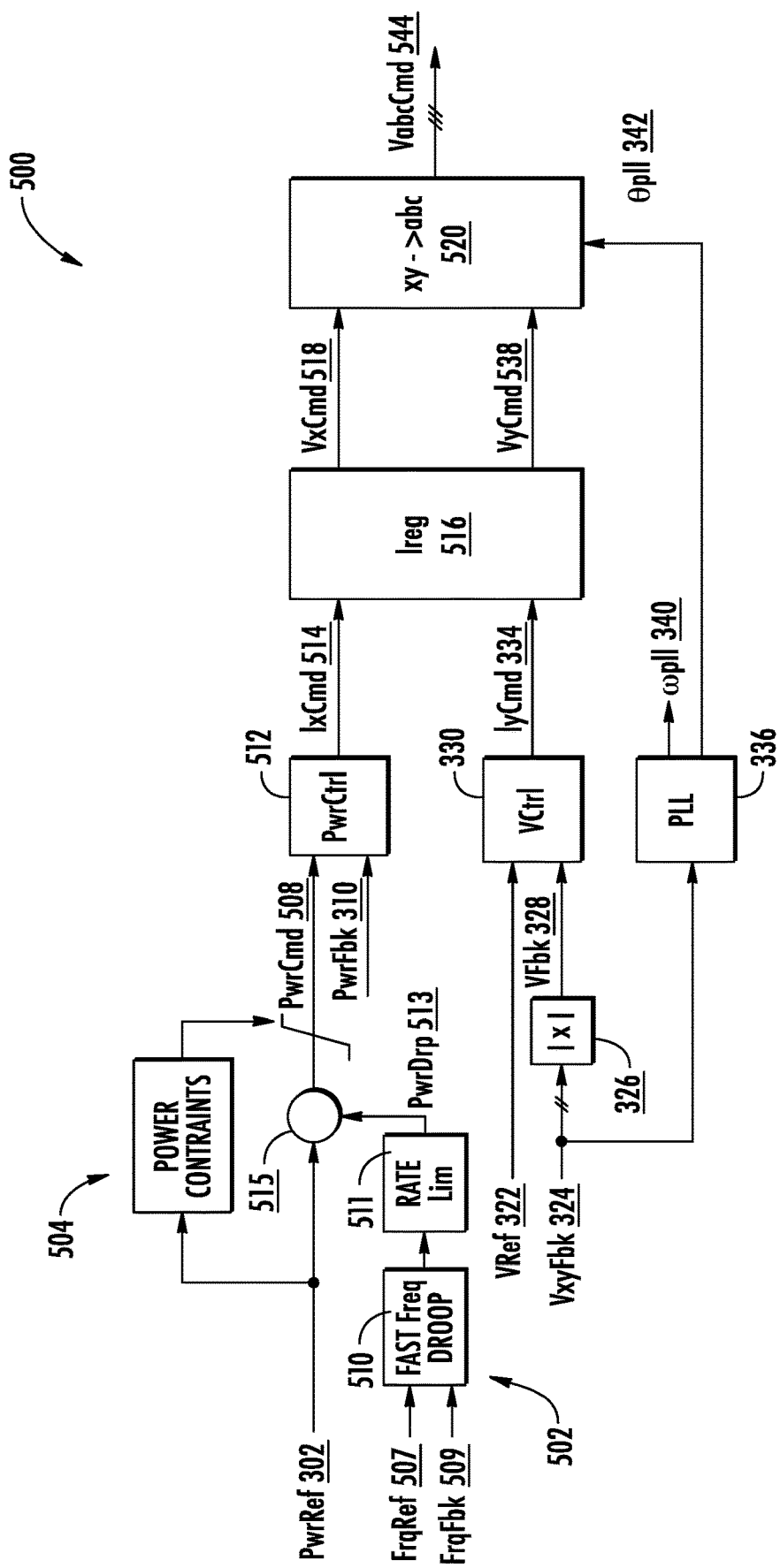
FIG. 9 illustrates a schematic diagram of one embodiment of an inverter-based resource control structure according to the present disclosure.
Figure 10:
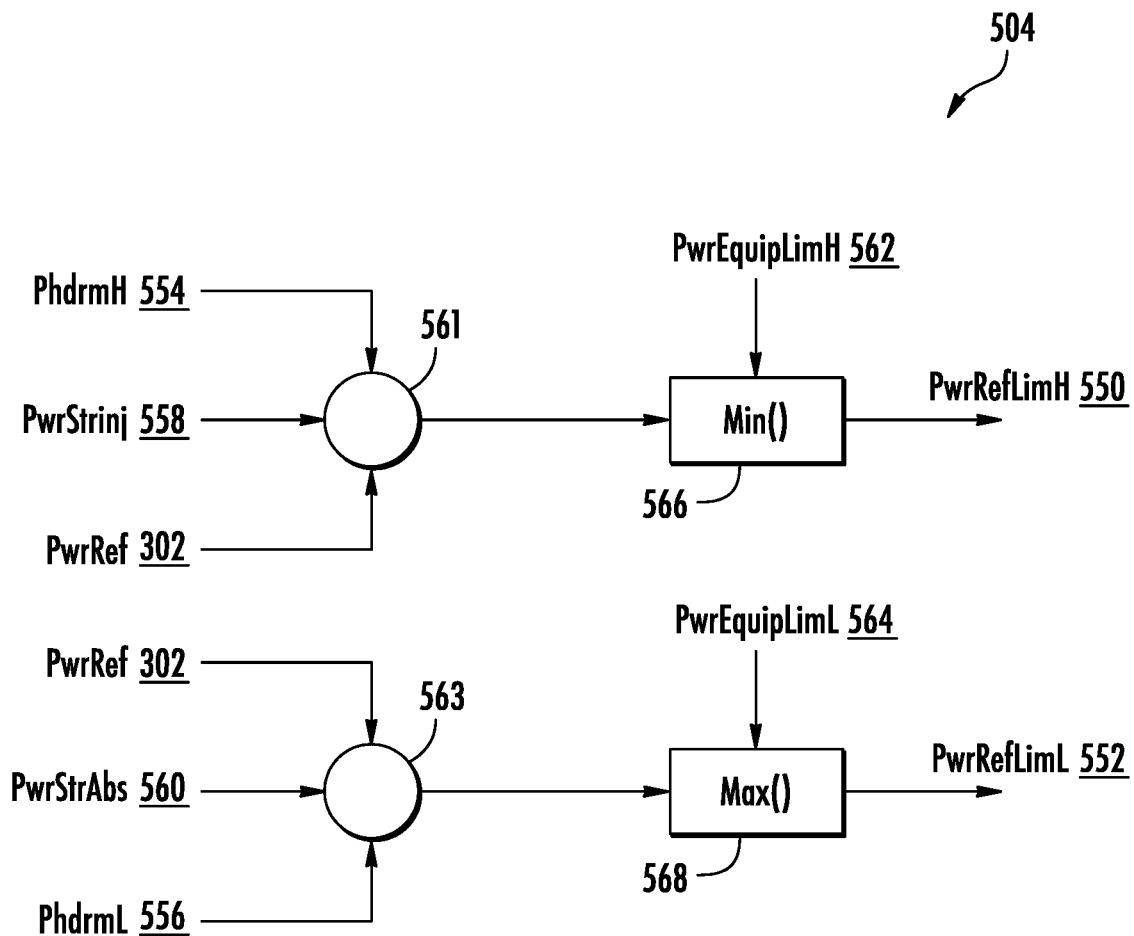
FIG. 10 illustrates a schematic diagram of one embodiment of example calculations for power constraints for an inverter-based resource control structure according to the present disclosure.
Figure 11:
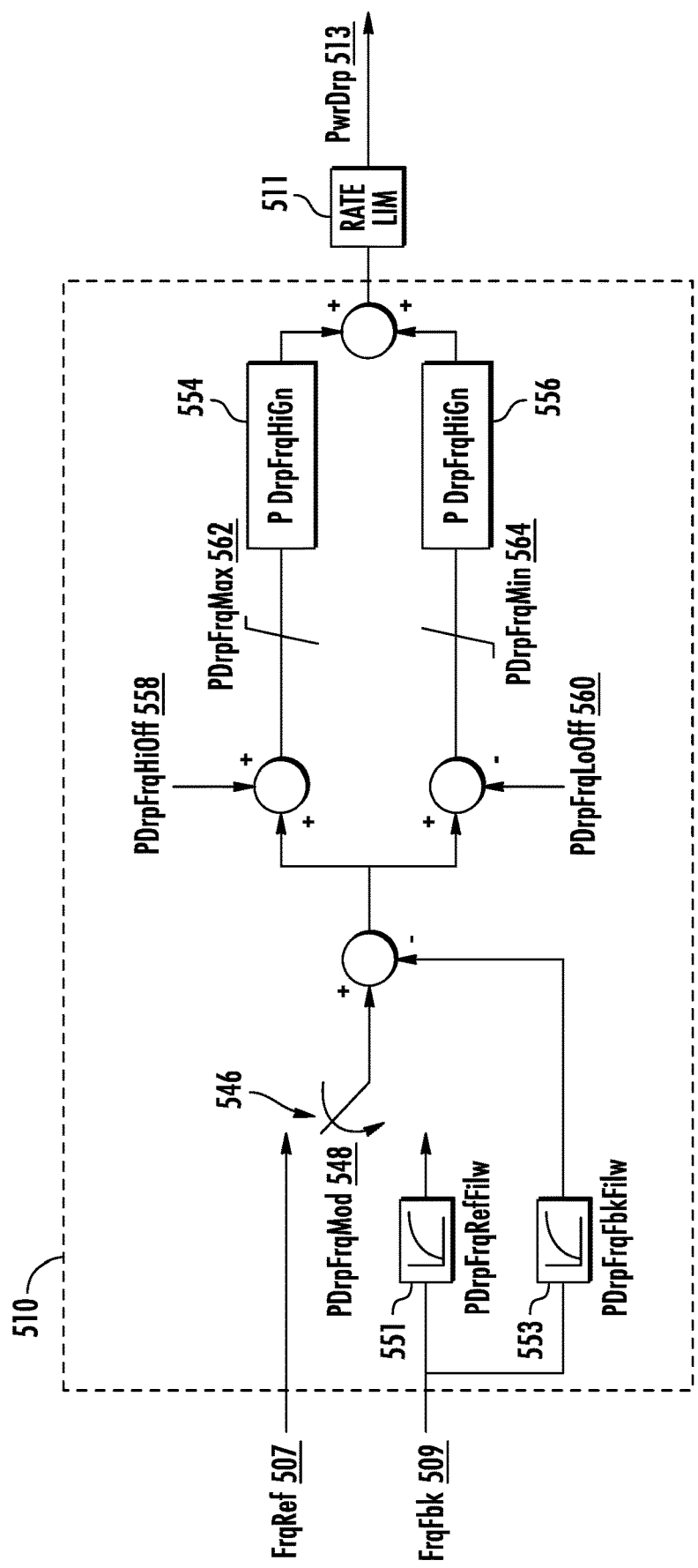
FIG. 11 illustrates a schematic diagram of one embodiment of internal components of a fast-frequency droop module of an inverter-based resource control structure according to the present disclosure.

Referring now to FIGS. 9-11, various schematic diagrams of a system 500 for controlling an inverter-based resource as well as components thereof according to the present disclosure are provided. In particular, FIG. 9 illustrates a schematic diagram of one embodiment of a system 500 for controlling an inverter-based resource having a power converter connected to an electrical grid according to the present disclosure. As shown, the system 500 may include many of the same features of FIG. 7 described herein, with components having the same reference characters representing like components. In addition, the illustrated IBR converter control structure can be used to control, e.g., the power converter 160, with fast closed-loop voltage control according to the present disclosure. In particular, as shown, two important additions are included in the IBR converter control structure 500 of FIG. 9 and are distinguished from the conventional IBR converter controller structure 300 of FIG. 7, including (1) a fast-frequency droop function 502 and (2) a power constraining function 504. Thus, the combination of this fast frequency droop together with fast voltage control allow for stable operation in systems with low levels of synchronous generation.

Furthermore, in an embodiment, as shown in FIG. 9, the system 500 receives the power reference (e.g., PwrRef 302). Moreover, as shown in FIGS. 9 and 11, the system 500 receives the grid frequency reference signal (e.g., FrqRef 507), and the grid frequency feedback signal (e.g., FrqFbk 509). Thus, as shown in FIGS. 9 and 11, the fast-frequency droop function 502 may include a fast-frequency droop module 510 that applies a droop function to the grid parameters 507, 509 to determine a power droop signal (e.g., PwrDrp 513). As used herein, the power droop signal (e.g., PwrDrp 513) generally refers to a power reference modification by the fast-frequency droop function. Moreover, in an embodiment, as shown in FIGS. 9 and 11, the system 500 may also include a rate limit module 511 in the fast-frequency droop to limit how fast grid-frequency changes can cause changes in power output to limit adverse equipment impacts, such as drivetrain stimulation on a wind turbine or rate of charge/discharge limits on a battery.

More specifically, as shown in FIG. 11, the fast-frequency droop module 510 can select between using the grid frequency (e.g., FrqRef 507) or the grid frequency feedback signal (e.g., FrqFbk 509) as shown via switch 546 to generate a power droop frequency modification signal (e.g., PDrpFrqMod 548). Moreover, as shown, the grid frequency feedback signal 509 may be filtered as shown via filters 551, 553. Further, as shown, the fast-frequency droop module 510 may include two parallel paths of frequency droop, e.g., (1) one path active for grid frequency above the reference, and (2) another path active for grid frequency below the reference. Thus, in such embodiments, the multiple paths allow for different droop response (e.g., via gains PdrpFrqHiGn 554 and PDrpFrqLoGn 556) for over versus under frequency events. In addition, as shown, one or more parameter offsets (e.g., PDrpFrqHiOff 558 and PDrpFrqLoOff 560) together with limits (e.g., PDrpFrqMax 562 and PDrpFrqMin 564) may be chosen to disable the droop for small deviations in grid frequency, while also retaining droop for large deviations in grid frequency.

As shown at 515, the system 500 generates a power command signal 508 as a function of the power reference signal 302 and the power droop signal 513 to allow for a fast response in a power output of the inverter-based resource to the one or more grid parameters of the electrical grid. In addition, as shown, the system 500 applies the power constraint(s) 504 to the power command signal 508 to limit how much the power output of the inverter-based resource can be changed due to the grid parameters 507, 509. Thus, as shown, a power controller 512 receives the power command signal 508 and the power feedback signal 310 and generates a current command (e.g., IxCmd 514).

Thus, in such embodiments, the power constraining function 504 limits how much the power output can be changed due to grid frequency conditions. Such constraints are needed to limit the impact of the grid-frequency changes on equipment, such as drive-train components on a wind turbine. These constraints also prevents the power demands from the grid from causing a trip of the IBR due to an imbalance in power available and power output, such as power demanded by the grid exceeding the available power from a plant.

For example, as shown in FIG. 10, a schematic diagram of one embodiment of example calculations for the power constraining function 504 for determining the upper and lower power constraints (e.g., PwrRefLimH 550 and PwrRefLimL 552) for an inverter-based resource control structure according to the present disclosure is illustrated. In particular, as shown, in an embodiment, the power constraining function 504 is configured to determine the upper power constraint 550 as a function of the power reference signal 302, an upper power headroom available to change the power output of the inverter-based resource based on one or more needs of the electrical grid (e.g., PhdrmH 554), and a power available within the inverter-based resource for injection from the electrical grid (e.g., PwrStrInj 558). Thus, as shown, such parameters may be compared, via comparator 561, and an output of the comparator 561 can be then compared to an upper equipment limit (e.g., PwrEquipLimH 562). Accordingly, as shown at 566, the minimum between the output of the comparator 561 and the upper equipment limit 562 can be determined to generate the upper power constraint 550.

In addition, and still referring to FIG. 10, in an embodiment, the power constraining function 504 is configured to determine the lower power constraint 552 as a function of the power reference signal 302, a lower power headroom available to change the power output of the inverter-based resource based on one or more needs of the electrical grid (e.g., PhdrmL 556), and a power available within the inverter-based resource for absorption from the electrical grid (e.g., PwrStrAbs 560). Thus, as shown, such parameters may be compared, via comparator 563 and an output of the comparator 563 can be then compared to a lower equipment limit (e.g., PwrEquipLimL 564). Accordingly, as shown at 568, the maximum between the output of the comparator 563 and the lower equipment limit 564 can be determined to generate the lower power constraint 552.

Referring back to FIG. 9 and similar to FIG. 7, as shown, a voltage controller 330 receives the voltage reference (e.g., VRef 322) that may come from slower VAR regulation functions or plant-level volt/VAR regulators, as well as one or more voltage feedback signals (e.g., VxyFbk 324). As shown at 326, the voltage feedback signals may be first processed to generate a single voltage feedback signal (e.g., VFbk 328) that is received by the voltage controller 330. The voltage controller 330 can then also generate a current command (e.g., IyCmd 334). The current commands 514, 334 can then be used by a current regulator 516 to generate respective voltage commands 518, 538.

Still referring to FIG. 9 and similar to the control structure 300 of FIG. 7, the IBR converter control structure 500 according to the present disclosure may also include a phase-locked loop 336 that uses the voltage feedback signal(s) (e.g., VxyFbk 324) to generate a phase-locked loop angle (e.g., θpll 342) and a phase-locked loop angular frequency (e.g., ωpll 340). Thus, as shown, the phase-locked loop angle 342 can be used, as shown at 520, to rotate the voltage commands 518, 538 to abc coordinates so as to generate a single voltage command (e.g., VabcCmd 544). The voltage command 544 can be sent to the converter controller 120 to provide suitable voltage control of the power converter 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an inverter-based resource connected to an electrical grid, the method comprising:
   receiving, via a controller, one or more grid parameters of the electrical grid;
   applying, via the controller, a droop function to the one or more grid parameters of the electrical grid to determine a power droop signal;
   receiving, via the controller, a power reference signal from an external controller;
   determining, via the controller, a power command signal as a function of the power droop signal and the power reference signal to allow for a fast response in a power output of the inverter-based resource to the one or more grid parameters of the electrical grid;
   applying, via the controller, one or more power constraints to the power command signal to limit how much the power output of the inverter-based resource can be changed due to the one or more grid parameters of the electrical grid;
   determining, via the controller, one or more control commands for the inverter-based resource based, at least in part, on the power command signal; and
   controlling, via the controller, the inverter-based resource based, at least in part, on the power command signal.

2. The method of claim 1, wherein the one or more grid parameters comprises at least one of a grid frequency signal and a grid frequency reference signal of the electrical grid.

3. The method of claim 2, wherein the droop function comprises a fast-frequency droop function, the method further comprising tuning the fast-frequency droop function with a response time ranging from about 10 milliseconds (ms) to about 100 ms.

4. The method of claim 3, wherein the fast-frequency droop function comprises one of a proportional droop function, a quadratic droop function, or a combination thereof.

5. The method of claim 1, further comprising applying a rate limit to the power droop signal to limit the how fast grid frequency changes can cause changes in a power output of the inverter-based resource so as to limit adverse equipment impacts thereof.

6. The method of claim 1, wherein the one or more power constraints comprises an upper power constraint and a lower power constraint, the method further comprising applying upper and lower power equipment limits to the upper and lower power constraints.

7. The method of claim 6, further comprising determining the upper power constraint as a function of a combination of two or more of the following: the power reference signal, an upper power headroom available to change the power output of the inverter-based resource based on one or more needs of the electrical grid, and a power available within the inverter-based resource for injection from the electrical grid.

8. The method of claim 7, further comprising determining the lower power constraint as a function of a combination of two or more of the following: the power reference signal, a lower power headroom available to change the power output of the inverter-based resource based on one or more needs of the electrical grid, and a power available within the inverter-based resource for absorption from the electrical grid.

9. The method of claim 8, wherein the inverter-based resource is part of a wind turbine power system having at least one generator.

10. The method of claim 9, wherein the power available within the inverter-based resource for injection from the electrical grid further comprises energy stored within a battery or a rotor of the wind turbine power system.

11. The method of claim 9, wherein the controller comprises at least one of a turbine controller or a converter controller of the wind turbine power system.

12. The method of claim 1, further comprising determining the power command signal as a function of the power droop signal and the power reference signal to allow for the fast response in the power output of the inverter-based resource to the one or more grid parameters of the electrical grid while also implementing fast closed-loop voltage control in the inverter-based resource.

13. A system for controlling an inverter-based resource connected to an electrical grid, the system comprising:

a controller comprising at least one processor, the at least one processor configured to perform a plurality of operations, the plurality of operations comprising:

applying a fast-frequency droop function to one or more grid frequency parameters of the electrical grid to generate a power droop signal that provides a fast response of a power output of the inverter-based resource to variations in the grid frequency while simultaneously implementing fast closed-loop voltage control in the inverter-based resource; and applying one or more power constraints to a power command signal of the inverter-based resource to limit how much the power output of the inverter-based resource can be changed due to the one or more grid frequency parameters of the electrical grid.

14. The system of claim 13, wherein the one or more grid frequency parameters comprises at least one of a grid frequency signal and a grid frequency reference signal of the electrical grid.

15. The system of claim 14, wherein the plurality of operations further comprises tuning the fast-frequency droop function with a response time ranging from about 10 milliseconds (ms) to about 100 ms.

16. The system of claim 15, wherein the fast-frequency droop function comprises one of a proportional droop function, a quadratic droop function, or a combination thereof.

17. The system of claim 13, wherein the plurality of operations further comprise applying a rate limit to the power droop signal to limit the how fast grid frequency changes can cause changes in the power output of the inverter-based resource so as to limit adverse equipment impacts thereof.

18. The system of claim 16, wherein the one or more power constraints comprises an upper power constraint and a lower power constraint, the plurality of operations further comprising applying upper and lower power equipment limits to the upper and lower power constraints.

19. The system of claim 18, wherein the plurality of operations further comprise:

receiving a power reference signal from an external controller;

determining the upper power constraint as a function of a combination of two or more of the following: the power reference signal, an upper power headroom available to change the power output of the inverter-based resource based on one or more needs of the electrical grid, and a power available within the inverter-based resource for injection from the electrical grid; and determining the lower power constraint as a function of a combination of two or more of the following: the power reference signal, a lower power headroom available to change the power output of the inverter-based resource based on one or more needs of the electrical grid, and a power available within the inverter-based resource for absorption from the electrical grid.

20. The system of claim 19, wherein the inverter-based resource is part of a wind turbine power system having at least one generator, the plurality of operations further comprising:

determining, via the controller, one or more control commands for the inverter-based resource based, at least in part, on the power reference signal; and controlling the inverter-based resource based, at least in part, on the power command signal.

* * * * *